No. 832,545. PATENTED OCT. 2, 1906.
F. W. GILLETT.
CHAIN.
APPLICATION FILED OCT. 3, 1904.

WITNESSES
Warren W. Swartz
A. H. M. Corwin

INVENTOR
Frank W. Gillett
by Bakewell & Byrnes
his attys

THE NORRIS PETERS CO., WASHINGTON, D. C.

UNITED STATES PATENT OFFICE.

FRANK W. GILLETT, OF EDGEWORTH, PENNSYLVANIA.

CHAIN.

No. 832,545.

Specification of Letters Patent.

Patented Oct. 2, 1906.

Application filed October 3, 1904. Serial No. 226,944.

*To all whom it may concern:*

Be it known that I, FRANK W. GILLETT, of Edgeworth, Allegheny county, Pennsylvania, have invented a new and useful Chain, of which the following is a full, clear, and exact description, reference being had to the accompanying drawings, forming part of this specification, in which—

Figure 1:
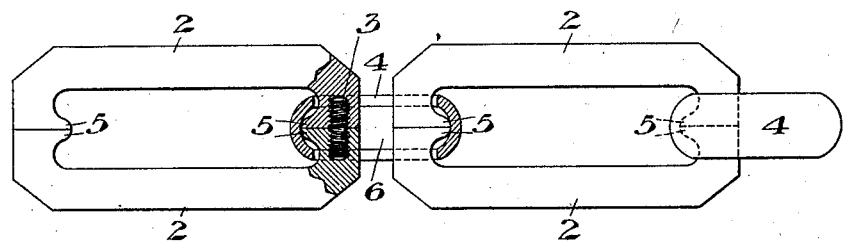
Figure 2:
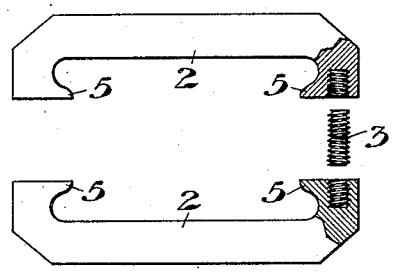
Figure 3:
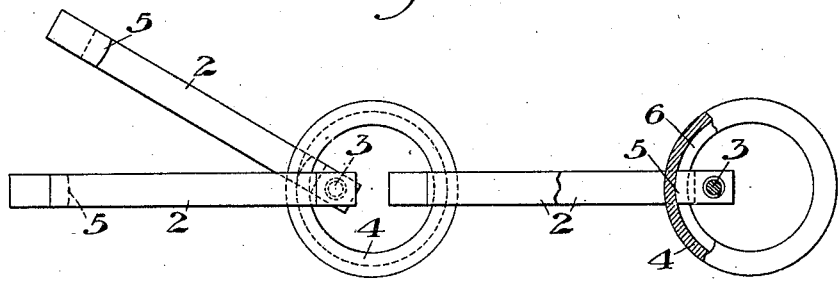

Figure 1 is an elevation showing a portion of my improved chain partly broken away. Fig. 2 is a detail view showing the two parts of the link, and Fig. 3 is an elevation showing the manner of opening the link.

My invention relates to the class of chains, and is designed to provide a simple, cheap, and attractive chain in which at least a part of the links are made in two or more parts, so that the chain may be assembled without welding.

A further object is to provide links of alternately different shapes, every other link being an integral one, which serves to hide the joint in the link formed of two or more parts.

In the drawings, 2 2 represent the two similar halves of a link which is divided on a central longitudinal plane which is transverse to the plane of the link. These two parts are alike in shape and size and may be cast or otherwise shaped. To secure the two parts together, I preferably employ a screw 3, which is secured within suitable screw-threaded holes extending in from the registering flat faces at one end. To secure this screw, the two parts may be drilled and tapped, or the screw may be otherwise secured within one part with a projectng end to screw into the other half of the link. The two parts may be thus secured together to form a link, one part rotating in a plane at right angles to the plane of the link.

In making up the length of chain I preferably employ the two-part links, as above described, with solid rings or links 4 connecting their ends, these solid links being threaded into the others in assembling them.

In order to more firmly hold the two parts of the divided links together, I preferably form the end portions of the two halves with inward projections or lips 5. These lips butt together when the two parts are joined together and enter a groove 6 in the integral ring or link. The sides of this groove thus serve to hold the lips in position and prevent pulling apart of the link when strain is brought thereon. The rings also serve to hide the joints and give a neat and attractive appearance.

The advantages of my invention result from the use of the link made in two parts, which are secured together by turning one part through a plane at right angles to the plane of the link. The two parts are similar and may be easily cast or otherwise formed. The chain can be easily lengthened or shortened by detaching the two parts of any link, and thus taking off or putting on one or more links of the chain. This is of especial advantage in chains for hanging lighting-domes, lamps, &c. The securing-screw is hidden from view, and the structure is simple, cheap, and efficient.

Many variations may be made in the form and arrangement of the parts of the separable link as well as in the integral joining-link, &c., without departing from my invention.

I claim—

1. A chain-link divided into two parts along a longitudinal plane transverse to the plane of the link, and a revoluble connection between said parts at one end of the link, one part being rotatable relatively to the other in a path at right angles to the plane of the link; substantially as described.

2. A chain-link having an open center and formed in two halves divided on parallel longitudinal planes transverse to the ends, and a rotatable connection between said parts at one end; substantially as described.

3. The combination with a chain-link made in two parts divided on longitudinal planes transverse to the plane of the link, and connected by a revoluble joint at one end; of a link engaging the divided link and of such width as to cover its end joint; substantially as described.

4. In a chain a two-part link having an end joint with inner projections and a link having an inclosed groove engaging said projections and covering the joint; substantially as described.

5. A chain-link divided into two parts along a longitudinal plane transverse to the plane of the link and secured together by an internal screw at one end; substantially as described.

6. In a chain a link made in two transversely-divided parts secured by an internal screw at one end which allows rotation of one part at right angles to the plane of the link, said parts having inwardly-projecting lips at the ends, and intermediate links having grooves engaging the lips and covering the joint; substantially as described.

7. In a chain-link divided into two parts by transverse cuts at its ends, a revoluble joint between said parts at one end said halves being constructed to butt together at the other end and provided with means whereby they may be secured; substantially as described.

8. In a chain-link formed in two parts by end cuts transverse to the plane of the link, a revoluble joint between said halves at one end of the link, and another link engaging the other divided ends and covering the end cuts and constructed to hold them together; substantially as described.

In testimony whereof I have hereunto set my hand.

FRANK W. GILLETT.

Witnesses:
GEO. B. BLEMING,
JOHN MILLER.